United States Patent Office 2,866,683
Patented Dec. 30, 1958

2,866,683

MANUFACTURE OF CHLORINE DIOXIDE FROM AN ALKALI METAL CHLORATE AND AN ALKALI METAL BISULFITE

Souren Z. Avedikian, Plainfield, N. J.

No Drawing. Original application January 30, 1956, Serial No. 562,017, now Patent No. 2,834,649, dated May 13, 1958. Divided and this application April 23, 1958, Serial No. 730,246

4 Claims. (Cl. 23—152)

This invention relates to a composition for preparing chlorine dioxide and to the method of preparing chlorine dioxide from said composition.

This application is a division of Serial No. 562,017, now Patent No. 2,834,649.

Liquid chlorine dioxide is of particular interest in the bleaching of wood pulp since it does not attack cellulosic fibers. However, chlorine dioxide gas is not a stable compound so that it must be generated at the place of use. The danger of explosion is avoided by mixing chlorine dioxide with air or other inert gas to obtain a mixture containing less than 10 percent chlorine dioxide by volume.

Also relatively concentrated aqueous solutions of chlorine dioxide are stable at room temperature for long periods of time.

There are many methods for preparing chlorine dioxide but they all are expensive procedures or cumbersome as to utilization of time and factory space.

It is an object of this invention to produce chlorine dioxide more inexpensively than ever before.

It is another object to produce chlorine dioxide conveniently and readily.

It is a further object to produce chlorine dioxide with a minimum of apparatus.

It is still another object to produce chlorine dioxide by a process having a by-product of ready sale.

These and other objects of this invention will become apparent upon reading the following descriptive disclosure.

According to this invention a stable mixture of salts is prepared which readily yields chlorine dioxide upon treatment with acid.

The stable mixture consists preferably of alkali metal chlorate and alkali metal bisulfite, for example $NaClO_3$ and $NaHSO_3$.

The chlorate bisulfite mixture is preferably an intimate finely ground dry mixture of the two salts, each salt being finely ground preferably before the mixing step. Separate strong aqueous solutions of these two salts, viz. sodium chlorate and sodium bisulfite are operable to release chlorine dioxide upon mixing followed by acid treatment. Furthermore the bisulfite and chlorate may be in the form of a single stable aqueous mixture prior to acidification. Thus the operable saline mixtures of this invention may be dry or wet with water. These mixtures are stable for long periods of time, for example, several days or weeks so that they may be prepared long before need for their use.

Upon use the dry powder mixture is treated with dilute aqueous acid preferably with a dilute mineral acid such as sulfuric acid. However, in the case of the aqueous concentrated salt solutions these are treated with concentrated mineral acids. In either case chlorine dioxide is formed in abundant quantity. The chlorine dioxide so formed is swept out of the reaction vessel by an inert gas preferably air to give a mixture of 10 percent or less of chlorine dioxide.

The gaseous chlorine dioxide prepared by this invention is generated smoothly and the gas is uncontaminated with other gases, for example sulfur dioxide, harmful to the subsequent use of chlorine dioxide as a bleaching gas.

The temperature used to liberate chlorine dioxide from its mixture may be from 40° C. to 80° C. but preferably 60° C. to 70° C. is used.

The following example illustrates this invention.

*Example*

Four hundred twenty six pounds of sodium chlorate are added to a vessel containing 200 gallons of water in which latter there are dissolved 208 pounds of sodium acid sulfite (also known as sodium bisulfite) and the resulting solution is treated with concentrated aqueous sulfuric acid in suitable amount to liberate chlorine dioxide.

The chemical reaction for this process is expressed as follows:

$$4NaClO_3 + 2NaHSO_3 + H_2SO_4 = 4ClO_2 + 3Na_2SO_4 + 2H_2O$$

Thus four mols of sodium chlorate are reacted with two mols of sodium bi-sulfite to produce four mols of chlorine dioxide.

In the above example the sodium sulfate precipitates out of solution and thus becomes available for use in the sulfate or kraft process of preparing wood pulp. As a result, where the kraft process is used for the making of wood pulp, the bleaching of the fibers of the wood pulp by the chlorine dioxide of this invention gives a salt useable as a make-up salt for the preparation of cooking liquor used to digest the wood chips.

Furthermore, where the chlorine dioxide of this invention is used to bleach the sulfite fibers prepared by the sulfite wood pulping process, the acid waste sulfite liquors having a pH of about 2 may be used to liberate the chlorine dioxide from the dry salt mixture in lieu of using sulfuric acid.

In this invention potassium chlorate and calcium chlorate are operable in lieu of the preferred sodium chlorate.

Clearly, this invention is not limited to the described embodiments for it is of a more generic scope.

I claim:

1. A dry chemical composition of matter for liberating pure chlorine dioxide upon treatment with aqueous acid solution consisting of four moles of finely divided sodium chlorate mixed with two moles of finely divided sodium bisulfite.

2. A wet composition of matter for liberating chlorine dioxide upon acidification consisting of four moles of an aqueous concentrated solution of alkali metal chlorate admixed with two moles of a concentrated solution of alkali metal bisulfite.

3. The method of preparing chlorine dioxide consisting of adding a dry mixture of a salt consisting of four moles of finely divided sodium chlorate mixed with two moles of finely divided sodium bisulfite to a suitable amount of aqueous acid solution to liberate chlorine dioxide.

4. The method of claim 3 wherein the acid solution is sulfuric acid maintained at 40° C. to 80° C.

References Cited in the file of this patent

UNITED STATES PATENTS

| | | |
|---|---|---|
| 2,309,457 | Hutchinson et al. | Jan. 26, 1943 |
| 2,317,443 | Cunningham | Apr. 27, 1943 |
| 2,335,808 | Soule | Nov. 30, 1943 |
| 2,338,268 | Stossel et al. | Jan. 4, 1944 |
| 2,451,826 | Haller | Oct. 19, 1948 |
| 2,481,854 | MacMahon | Sept. 13, 1949 |
| 2,482,891 | Aston | Sept. 27, 1949 |
| 2,484,401 | Day et al. | Oct. 11, 1949 |